UNITED STATES PATENT OFFICE.

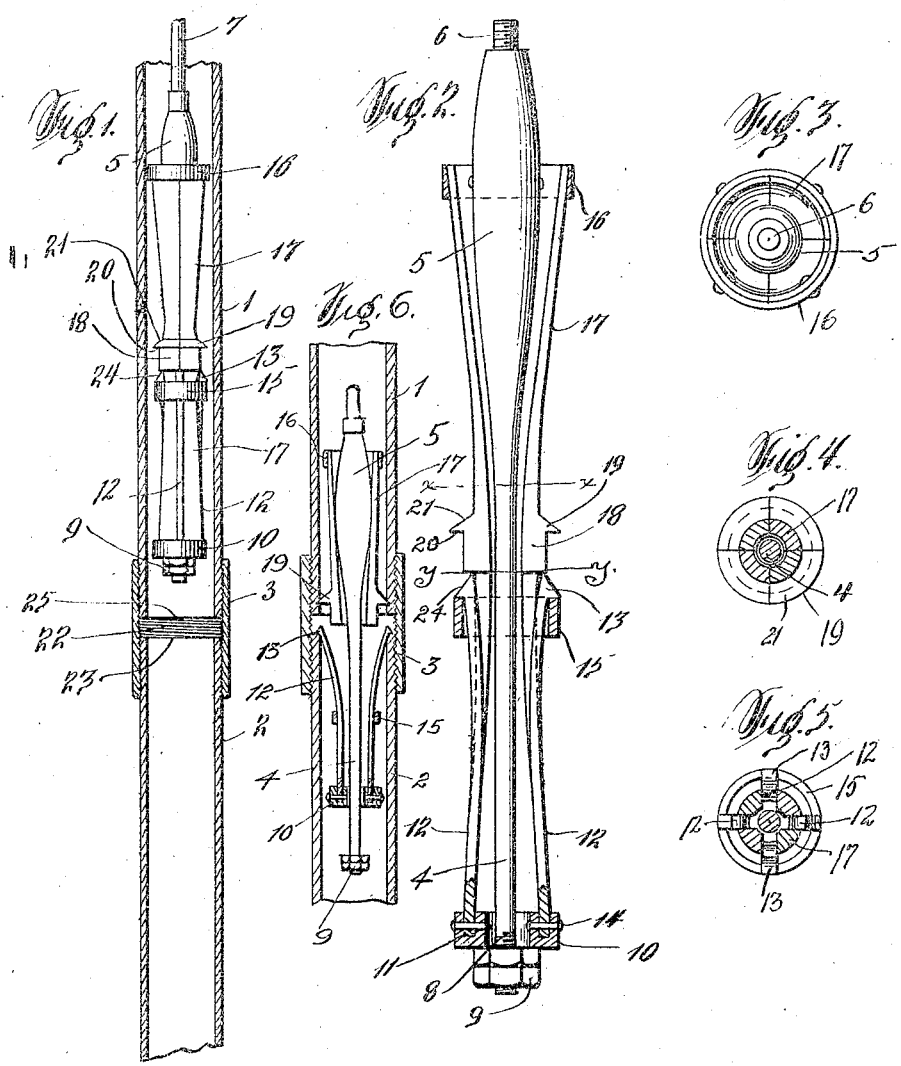

JESSE FARRIS BAKER, OF LITTLETON, WEST VIRGINIA.

WELL-TUBE CUTTER.

942,701.　　　　　　　　Specification of Letters Patent.　　　Patented Dec. 7, 1909.

Application filed July 31, 1909.　Serial No. 510,607.

*To all whom it may concern:*

Be it known that I, JESSE FARRIS BAKER, a citizen of the United States of America, residing at Littleton, in the county of Wetzel and State of West Virginia, have invented certain new and useful Improvements in Well-Tube Cutters, of which the following is a specification, reference being had therein to the accompanying drawing.

This invention relates to a device for cutting oil-well tubings and couplings within a well so as to enable the removal of a portion of the tubing when occasion so requires thereby overcoming the necessity of withdrawing the tubing from the well as an entirety when it is desired to remove only a portion of the tubing and to this end the invention consists of the novel construction, combination and arrangement of parts as hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings wherein like reference characters denote corresponding parts throughout the several views, Figure 1 is a vertical sectional view of a portion of an oil-well tubing and further showing in side elevation a cutting device in accordance with this invention in inoperative position, Fig. 2 is a sectional elevation of a cutting device in accordance with this invention showing the same in an operative position, Fig. 3 is a top plan of a cutting device. Fig. 4 is a section on line x—x, Fig. 2. Fig. 5 is a section on line Y—Y, Fig. 2 and Fig. 6 is a view similar to Fig. 1 showing the cutting device in an operative position.

Referring to the drawings in detail, 1 and 2 denote sections of an oil-well tubing connected together by the coupling or union 3. A cutting device in accordance with this invention comprises a combined support and operating member 4 consisting of an elongated bar having an enlarged tapering upper portion 5 formed with the screw-threaded extension 6 to which is connected a shifting rod 7. The lower end of the member 4 is screw-threaded as at 8 and carries a pair of supporting nuts 9. Mounted upon the nuts 9 is an annular member 10 of greater diameter than the nuts 9 and which is formed in its upper face with a groove 11 into which extends the lower portion of a series of resilient members 12, each provided at its upper end with a hook 13, the function of which will be hereinafter referred to. The lower portions of the hangers 12 are fixedly secured to the annular member 10 by the transversely extending hold-fast devices 14. The free ends of the resilient hangers 12 are normally maintained in a contracted position through the medium of a holding band 15, which when in its operative position abuts against the hooked ends of the hangers 12 as shown in Figs. 1 and 2.

Surrounding the enlarged upper portion of the bar 4 is a collar 16 having secured thereto by suitable hold-fast devices, by way of example, rivets, a series of resilient shanks 17 which depend from said collar 16 and have their lower ends as at 18 enlarged and each provided with a cutting tooth 19. The shanks 17 abut and are circumferentially disposed around the bar 4. Each of the cutting teeth 19 is quadrantal in contour and has a flat lower face 20 and a beveled upper face 21. The enlarged lower ends 18 of the shank 17 are seated upon the hooked ends 13 of the hangers 12 whereby the cutters are always maintained above the hangers 12 and even when the teeth 19 perform their cutting function.

The operation of the device is as follows: it will be assumed that the device has been lowered within the tubing as shown in Fig. 1, the device is then jarred which causes the holding band 15 to drop down upon the hangers 12 so that the hooked ends of the hangers will be projected to engage the inner face of the tubing, the device is then lowered until the hooked ends of the hangers 12 are positioned at the space 22 formed between the opposing ends of the sections of the tubing, (see Fig. 1) if the device is further lowered, the hooked ends 13 of the hangers 12 will engage the upper edge 23 of the section 2 of the tubing, whereby the downward movement of the device will be arrested, at this point the operator shifts the bar 4 downwardly through the medium of the rod 7, such action causing the enlarged portion 5 of the bar 4 to gradually force the lower ends of the shank 17 outwardly causing the cutting teeth 18 to penetrate the section 1 of the tubing and also the coupling 3 to such an extent that that portion of the tubing above the teeth 19 can be broken off and removed from the well. The beveled upper surfaces 21 of the teeth 19 enable the teeth to readily penetrate the section 1 of the tubing and the coupling 3 so as to properly perform the cutting function. After the severed tubing has been removed, the device is withdrawn, the beveled upper portions 24 of the hooked ends 13 of the hangers 12 allow for the ready passing of the hooked ends of the hangers 12 by the lower edge 25 of the section 1. The device is removed by elevating the bar 5 through the medium of the rod 7 so that the nuts 9 will engage the annular member 10.

What I claim is:

1. A cutting device for the purpose set forth comprising a plurality of resilient hangers having hook-shaped upper ends, a plurality of shanks supported by the hooked ends of said hangers and each provided with a cutting tooth, and a combined supporting and operating member extending through said shanks and hangers and provided with means adapted to engage the shanks to project them to cause the cutting action of the teeth.

2. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, and a holding band for normally maintaining the hangers in a contracted position.

3. A cutting device for the purpose set forth comprising a plurality of resilient hangers having hook-shaped upper ends, a plurality of shanks supported by the hooked ends of said hangers and each provided with a cutting tooth, and a combined supporting and operating member extending through said shanks and hangers and provided with means adapted to engage the shanks to project them to cause the cutting action of the teeth, each of the cutting teeth being segmental in contour and further having a flat lower face and a beveled upper face.

4. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, and a holding band for normally maintaining the hangers in a contracted position, each of said cutting teeth being segmental in contour and having a beveled upper face and a flat lower face.

5. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, and an annular member for supporting and connecting together the lower ends of said hangers.

6. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, a holding band for normally maintaining the hangers in a contracted position, and an annular member for supporting and connecting together the lower ends of said hangers.

7. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, each of the cutting teeth being segmental in contour and further having a flat lower face and a beveled upper face, and an annular member for supporting and connecting together the lower ends of said hangers.

8. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, a holding band for normally maintaining the hangers in a contracted position, each of said cutting teeth being segmental in contour and having a beveled upper face and a flat lower face, and an annular member for supporting and connecting together the lower ends of said hangers.

9. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, an annular member for supporting and connecting together the lower ends of said hangers, and a collar for connecting the upper ends of said shanks together.

10. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, a holding band for normally maintaining the hangers in a contracted position, an annular member for supporting and connecting together the lower ends of said hangers, and a collar for connecting the upper ends of said shanks together.

11. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, each of the cutting teeth being segmental in contour and further having a flat lower face and a beveled upper face, an annular member for supporting and connecting together the lower ends of said hangers, and a collar for connecting the upper ends of said shanks together.

12. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, a holding band for normally maintaining the hangers in a contracted position, each of said cutting teeth being segmental in contour and having a beveled upper face and a flat lower face, an annular member for supporting and connecting together the lower ends of said hangers, and a collar for connecting the upper ends of said shanks together.

13. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, an annular member for supporting and connecting together the lower ends of said hangers, and a collar for connecting the upper ends of said shanks together, said hangers having the hooked ends thereof beveled on their upper faces.

14. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, a holding band for normally maintaining the hangers in a contracted position, an annular member for supporting and connecting together the lower ends of said hangers, and a collar for connecting the upper ends of said shanks together, said hangers having the hooked ends thereof beveled on their upper faces.

15. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, each of the cutting teeth being segmental in contour and further having a flat lower face and a beveled upper face, an annular member for supporting and connecting together the lower ends of said hangers, and a collar for connecting the upper ends of said shanks together, said hangers having the hooked ends thereof beveled on their upper faces.

16. A cutting device for the purpose set forth comprising a plurality of resilient hangers having hook-shaped upper ends, a plurality of shanks supported by the hooked ends of said hangers and each provided with a cutting tooth, a combined supporting and operating member extending through said shanks and hangers and provided with means adapted to engage the shanks to project them to cause the cutting action of the teeth, a holding band for normally maintaining the hangers in a contracted position, each of said cutting teeth being segmental in contour and having a beveled upper face and a flat lower face, an annular member for supporting and connecting together the lower ends of said hangers, and a collar for
5 connecting the upper ends of said shanks together, said hangers having the hooked ends thereof beveled on their upper faces.

In testimony whereof I affix my signature in the presence of two witnesses.

JESSE FARRIS BAKER.

Witnesses:
O. F. GLOVER,
C. F. FRANZ.